Patented Oct. 31, 1939

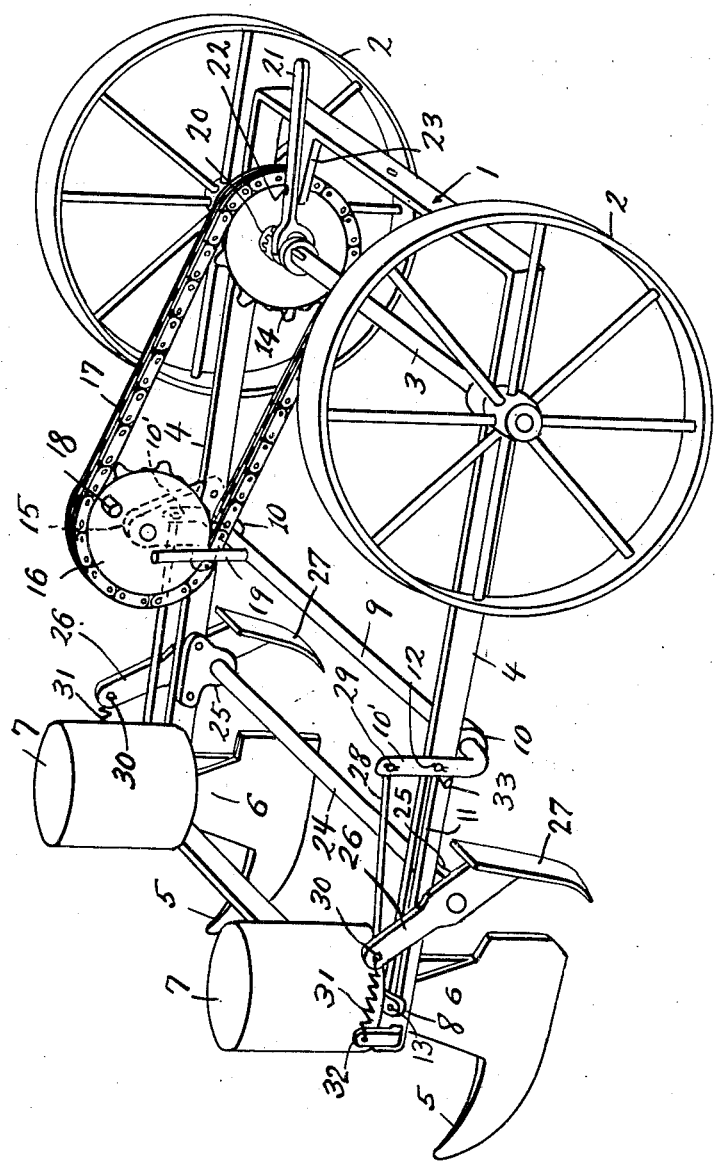

2,178,053

UNITED STATES PATENT OFFICE 2,178,053

CORN PLANTER

John N. Stout, Staunton, Ind.; Robert B. Stewart administrator of said John N. Stout, deceased Application May 12, 1938, Serial No. 207,605

1 Claim. (Cl. 111—30)

My invention relates to improvements in corn planters, and more particularly to combined valve operating mechanism and hill markers therefor.

The object of the invention is to equip a corn planter with simply constructed, efficient mechanism for operating the seed dropping valves thereof at regular intervals and marking the location in which the seed is dropped, thereby dispensing with the usual check row wires and devices essential to the use thereof.

To the accomplishment of the above, and subordinate objects presently appearing, a preferred embodiment of my invention has been illustrated in the accompanying drawing, set forth in detail in the succeeding description, and defined in the claim appended hereto.

In the drawing, the single figure thereof illustrates a corn planter, conventionally shown, equipped according to my invention.

Referring to the drawing by numerals, 1 designates the usual frame of the planter supported at its rear end by ground wheels 2 fast upon opposite ends of an axle 3 journaled in the side bars 4 of the frame. At the front of the frame 1, on opposite sides thereof, are the usual runners, or furrow openers, 5 and the trailing delivery chutes, or boots, 6. Surmounting the delivery chutes 6 are the usual seed boxes 7 suitably mounted on the frame 1 and having in the bottom thereof seed dropping valves, not shown, operative by means of valve operating arms, one of which is shown at 8.

According to my invention, the valve operating arms 8 are operated through the medium of a rock shaft 9 journaled in bearings 10 on the frame side bars 4 to extend across the frame 1 in advance of the ground wheels 2, said shaft having on its opposite ends upstanding crank arms 10' operatively connected to the valve operating arms 8 by means of rods 11 pivoted to the crank arms 10', as at 12, and to the valve operating arms 8, as at 13. The described connection between the crank arms 10' and valve operating arms 8 is such that when the rock shaft 9 is rocked in the proper direction, i. e., clockwise, as viewed in the drawing, the valve operating arms 8 will be moved to effect dropping of the seed by the before-mentioned valves.

The rock shaft 9 is operated in the described direction by means of the following. Loose on the axle 3, adjacent one side bar 4, is a sprocket wheel 14. Rotatably mounted on a bearing 15 arising from said one side bar 4 is a second sprocket wheel 16 having its axis of rotation directly over the rock shaft 9. A sprocket chain 17 connects said sprocket wheels 14 and 16. A tappet stud 18 extending laterally from the sprocket wheel 16 engages during each revolution of said wheel 16, a tappet rod 19 on the rock shaft 9 to operate said shaft in the proper degree, said stud then wiping past the tappet rod 19, as will be clear. The sprocket wheel 14 is adapted to be connected to the axle 3 for rotation thereby through the medium of a suitable clutch, indicated at 20, engaged and disengaged by means of a clutch lever 21 pivoted as at 22 on a bracket 23 extending from the frame 1. The sprocket wheels 14 and 16 are preferably counterparts, one of the other, and so designed that the rock shaft 9 is operated, in the manner described, to effect dropping of the seed in locations approximately 3 feet, 6 inches apart.

Intermediate the rock shaft 9 and the seed boxes 7, and closely adjacent to the delivery chutes 6, is a marker rock shaft 24 journaled adjacent its opposite ends in bearing brackets 25 depending from the frame side bars 4. Fixed intermediate their ends on opposite ends of said rock shaft 24 is a pair of upstanding marker arms 26 laterally spaced outwardly relative to the delivery chutes 6. The lower ends of the marker arms 26 are equipped with pointed marker blades 27 of the cultivator shovel type, which, under operation of the marker rock shaft 24, as presently described, are adapted to excavate a shallow pit in the ground alongside the location of each planting. The marker rock shaft 24 is operated, to effect the described operation of the marker blades 27, in the same direction as the rock shaft 9, and by means of a link 28 pivotally connected at its opposite ends to the upper end of one of the crank arms 10' and one of the marker arms 26, as at 29 and 30. Normally the marker arms 26 are inclined so as to elevate the marker blades 27 off the ground and are tensioned against movement from normal position by means of a pair of tension springs 31 suitably connected to the upper ends thereof and to lugs, one of which is shown at 32 on the frame bars 4. As will be clear, the springs 31 also tension the rock shaft 9 against clockwise operation, since one of the crank arms 10' thereof is connected to one of the marker arms 26. A stud 33 extending from one of the frame side bars 4 for engagement by one of the crank arms 10' limits movement of the rock shaft 9 under the urge of the springs 31 and thereby establishes the normal position of said shaft 9, together with the marker rock shaft 24, marker arms 26 and marker blades 27.

Referring to the operation of the invention, the clutch 20 is engaged at an appropriate point in the travel of the planter in starting across the field, whereupon after the planter has progressed a distance set forth in the foregoing, the stud 18 wipingly engages the tappet arm 19 and rocks the rock shaft 9, against the tension of the springs 31 to operate the valve operating arms 8, in the manner already described, and effects dropping of the seed from the seed boxes 7. Co-incidentally with this operation the marker arms 26 and marker blades 27 are rocked, by means of the link 28 and related crank arm 10', and the marker blades 27 thrown downwardly and forwardly into and out of the ground to dig a shallow pit alongside the dropped seed, thereby marking the location of the same. At this point the stud 18 wipes past the tappet arm 19, thereby releasing said arm, rock shaft 9, and the described parts operated thereby, whereupon said shaft, together with the rock shaft 24, marker arms 26, and marker blades 27 are returned to normal position by the springs 31. These operations are repeated at the described intervals as the planter progresses across the field.

The foregoing will, it is believed, suffice to impart a clear understanding of my invention without further explanation.

Manifestly the invention, as described, is susceptible of modifications without departing from the inventive concept and right is herein reserved to such modifications as fall within the scope of the subjoined claim.

What I claim is:

In a corn planter including a wheel supported frame, an axle rotated by said wheels, and seed planting means including a pair of operating arms therefor on opposite sides of said frame, means to intermittently operate said arms including a rock shaft mounted on said frame parallel with said axle and operatively connected to said arms, said shaft having an upstanding tappet rod thereon adjacent one side of the frame, a sprocket wheel rotatably mounted on said side of the frame over said rock shaft and having a tappet stud extending laterally therefrom for wiping engagement with said tappet rod, a sprocket wheel loose on the axle, a sprocket chain connecting said sprocket wheels, a clutch for operatively connecting the axle with the sprocket wheel thereon, and means operative by said rock shaft to dig a pit alongside the planting location simultaneously with the planting operation, including a marker rock shaft mounted on said frame parallel with the first mentioned rock shaft, a pair of marker arms fast on opposite ends of said marker rock shaft and located upon opposite sides of the frame, a pair of shovel-like marker blades on said marker arms, respectively, operating connections between the first mentioned rock shaft and one of said marker arms, and spring means tensioning said marker arms against operation.

JOHN N. STOUT.